(12) United States Patent
Arisawa et al.

(10) Patent No.: US 6,950,074 B2
(45) Date of Patent: Sep. 27, 2005

(54) NONCONTACT TYPE IC CARD

(75) Inventors: Shigeru Arisawa, Tokyo (JP); Osamu Ishii, Kanagawa (JP); Toshiharu Tsuchiya, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/239,755

(22) PCT Filed: Jan. 24, 2002

(86) PCT No.: PCT/JP02/00492

§ 371 (c)(1),
(2), (4) Date: Feb. 4, 2003

(87) PCT Pub. No.: WO02/059832

PCT Pub. Date: Aug. 1, 2002

(65) Prior Publication Data

US 2003/0151561 A1 Aug. 14, 2003

(30) Foreign Application Priority Data

Jan. 26, 2001 (JP) ........................................ 2001-018694

(51) Int. Cl.[7] .................................................. H01Q 7/00
(52) U.S. Cl. ........................ 343/748; 343/741; 343/751
(58) Field of Search ................................ 343/748, 751, 343/741, 742, 895

(56) References Cited

U.S. PATENT DOCUMENTS 6,126,077 A * 10/2000 Tanaka et al. ............... 235/492
6,595,418 B1 * 7/2003 Igarashi et al. .............. 235/385

FOREIGN PATENT DOCUMENTS

| EP | 0 855 674 A2 | 7/1998 |
|----|--------------|--------|
| EP | 0 967 568 A2 | 12/1999 |
| EP | 0 997 842 A2 | 5/2000 |
| EP | 1 033 675 A2 | 9/2000 |
| JP | 11122147 A | 4/1999 |
| JP | 11145717 A | 5/1999 |
| JP | 2000059260 A | 2/2000 |
| JP | 2001-5930 | 1/2002 |
| JP | 2001-7629 | 1/2002 |

OTHER PUBLICATIONS

Austrialian Search Report and Written Opinion dated Jun. 10, 2003.
International Search Report.
EPO Search Report dated Mar. 31, 2005.

* cited by examiner

Primary Examiner—Shih-Chao Chen
(74) Attorney, Agent, or Firm—Rader, Fishman & Grauer PLLC; Ronald P. Kananen

(57) ABSTRACT

The present invention relates to an electronic device that suppresses reduction in reception sensitivity and occurrence of distortion when IC cards are used while stacked. A loop antenna equipped on the IC card has up to four turns, and is designed so that one turn, for example, has a first linear portion, a first curved line portion, a second linear portion, and a second curved line portion. When two electronic devices having a first loop antenna and a second loop antenna, respectively, are stacked onto one another, the corners of the loop antennas do not overlap. For example, the corner formed by first curved line portion and the second linear portion of the first loop antenna is overlapped with the first curved line portion of the second loop antenna. The first and second loop antennas are shaped such that when two electronic devices are stacked, their respective loop antennas are superimposed in the opposite direction so that the corners are not overlapped and the amount of overlap as a whole is reduced. The present invention may be applied to an IC card for receiving/transmitting data under non-contact state.

12 Claims, 13 Drawing Sheets

NONCONTACT TYPE IC CARD

TECHNICAL FIELD

The present invention relates to an electronic device, and particularly to an electronic device for suppressing reduction of a reception efficiency at maximum and performing the processing on the basis of signals having little distortion when data are written into or read from plural IC cards under a non-contact state while the plural IC cards are stacked.

BACKGROUND OF THE INVENTION

Recently, non-contact type IC (Integrated Circuit) cards have been popular, and they have been introduced as common tickets to transportation facilities such as subways, buses, or ferries and for electronic money systems, etc. The data writing/reading into/from the IC cards are carried out in the non-contact style on the basis of the principle of electromagnetic induction.

That is, in the non-contact IC card system, electromagnetic wave is emitted from a loop antenna having a reader/writer for writing/reading data into/from an IC card, and the electromagnetic wave emitted is received by a loop antenna equipped in the IC card, whereby communications are made between the IC card and the reader/writer.

Further, in order to eliminate a load imposed on an IC card maintenance work, the IC card is provided with no battery, and thus it is designed to achieve required power from the electromagnetic wave received. Therefore, the IC card is required to receive electromagnetic wave as efficiently as possible.

In general, the IC card is equipped therein with a loop antenna 1 having two or more turns of wire formed in a rectangular shape which is as large as possible as shown in FIG. 1. The loop antenna 1 receives signals by resonating a resonance circuit with the carrier frequency of electromagnetic wave emitted from the reader/writer.

The IC card is basically used alone, however, there is a case where two IC cards are used together with being stacked. For example, when a user passes over a commuter pass zone and then gets off at a station out of the commuter pass zone, the user presents his/her commuter pass and an iO card (trademark) (it is assumed that each of the cards comprises an IC card) to a reader/writer while these cards are stacked in order to adjust the surcharge of the over-zone. At this time, the reader/writer or a non-contact IC card system connected to the reader/writer recognizes the zone of the commuter pass thus presented, and then carries out the processing of calculating the extra distance the user has ridden, calculating the surcharge based on the extra distance of the over-zone and adjusting the account on the iO card.

Not only when one IC card is presented, but also when plural IC cards are stacked, it is necessary that electromagnetic wave can be efficiently received so that each of the IC cards can operate desired communication operations.

For example, when two IC cards each having a loop antenna 1 having the construction shown in FIG. 1 are stacked with the IC card placed face up while being perfectly overlapped with each other in the view from the upper side (when the two IC cards are stacked so that the top side of one card faces the back side of the other card) as shown in FIG. 2, the linear portions L1 to L9 constituting the respective sides of rectangles of the conductor constituting the loop antenna 1-1 of one IC card are overlapped with the corresponding linear portions L11 to L19 of the loop antenna 1-2 of the other IC card, respectively. At this time, the resonance frequency of the resonance circuit of the loop antenna 1-1, 1-2 is reduced to the inverse of the square root of 2 ($1/\sqrt{2}$) of the resonance frequency when only one loop antenna 1 is provided (only one IC card is provided).

That is, when the IC cards are overlapped, coupling occurs between the resonance circuits thereof. Therefore, the resonance frequency is equal to $1/(2\pi\sqrt{(LC)})$ in the case of one IC card, however, it is equal to $1/(2\pi\sqrt{(L\cdot(2C))})=(1/\sqrt{2})\cdot 1/(2\pi\sqrt{(LC)})$ in the case of two stacked IC cards. That is, when IC cards are stacked, the resonance frequency of the resonance circuit of each IC card is displaced from the carrier frequency of the electromagnetic wave by $1/\sqrt{2}$, and the reception efficiency is reduced.

However, for example when the carrier frequency of the electromagnetic wave emitted from the reader/writer is equal to 13.56 MHz, by setting the resonance frequency of the resonance circuit of each IC card to 17.5 MHz higher than the carrier frequency in advance, the electromagnetic wave can be received not only when only one IC card is used, but also even when two IC cards are used while they are stacked so as to be faced in the same direction.

When IC cards are stacked while one IC card is placed face up and the other IC card is placed face down as shown in FIG. 3 (two IC cards are stacked while both the top sides thereof or both the back sides thereof face each other), both the linear portion L1 of the loop antenna 1-1 and the linear portion L13 of the loop antenna 1-2, both the linear portion L2 of the loop antenna 1-1 and the linear portion L12 of the loop antenna 1-2 and both the linear portion L3 of the loop antenna 1-1 and the linear portion L11 of the loop antenna 1-2 are respectively basically overlapped with each other, however, the overlapping style is more complicated than that of FIG. 2.

The theoretical ground has not been necessarily clear, however, it has been discovered from at least experiment results that the resonance frequency is further reduced as compared with the case where IC cards are stacked as shown in FIG. 2. As described above, the method of setting the resonance frequency of the resonance circuit to a value higher than the carrier frequency in advance in consideration of the case where plural IC cards are stacked has such a problem that it can achieve a sufficient effect both when one IC card is used and when two IC cards are stacked so as to be faced in the same direction as shown in FIG. 2, however, it cannot achieve a sufficient effect when two IC cards are stacked so as to be faced in the opposite directions as shown in FIG. 3.

Further, there is a problem that when two IC cards are stacked, reception signals contain distortion.

DISCLOSURE OF THE INVENTION

The present invention has been implemented in view of the foregoing situation, and has an object to prevent reduction in reception efficiency and thus reduce distortion of signals received by designing loop antennas so that it is difficult to couple the loop antennas even when IC cards are overlapped with one another in any way.

A loop antenna of an electronic device according to the present invention is characterized in that the loop antenna is shaped so that even when plural electronic devices are stacked so that at least parts of the top sides thereof face one another or at least parts of the back sides thereof face one another, the conductors constituting the portions of the loop antennas which are located in the neighborhood of the corners of the electronic devices each having a substantially rectangular shape are prevented from being overlapped with one another.

The loop antenna may be designed to have a parallelogram shape or elliptical shape as a basic shape.

The basic shape of the loop antenna may be constructed as a substantially annular shape by a combination of two straight lines and two curved lines while the two straight lines are disposed in parallel to each other.

The basic shape of the loop antenna may be constructed as a substantially annular shape by a combination of two or four curved lines that are different in shape.

A loop antenna of an electronic device according to the present invention is characterized in that one of two corner portions that are disposed so as to sandwich the center line therebetween is disposed to be close to the center line, and the other corner portion is disposed to be far away from the center portion.

A loop antenna of an electronic device according to the present invention is characterized in that the loop antenna is shaped so that the line connecting two points of the loop antenna that are located at the closest positions to the corners of the electronic device so as to confront each other is coincident with a diagonal line of the electronic device having a substantially rectangular shape.

An information writing/reading device according to the present invention is characterized by including reading/writing means for writing/reading information into/from plural electronic devices when the plural electronic devices are partially overlapped with one another, the plural electronic devices having loop antennas shaped so that when the plural electronic devices are stacked so that at least parts of the top sides thereof face one another or at least parts of the back sides thereof face one another, the conductors constituting the portions of the loop antennas that are located in the neighborhood of the corners of the electronic devices each having a substantially rectangular shape are not overlapped with one another.

An information writing/reading method according to the present invention is characterized by including a writing/reading step of writing/reading information into/from plural electronic devices when the plural electronic devices are partially overlapped with one another, the plural electronic devices having loop antennas shaped so that when the plural electronic devices are stacked so that at least parts of the top sides thereof face one another or at least parts of the back sides thereof face one another, the conductors constituting the portions of the loop antennas that are located in the neighborhood of the corners of the electronic devices each having a substantially rectangular shape are not overlapped with one another.

BEST MODES FOR IMPLEMENTING THE INVENTION

Figure 4:
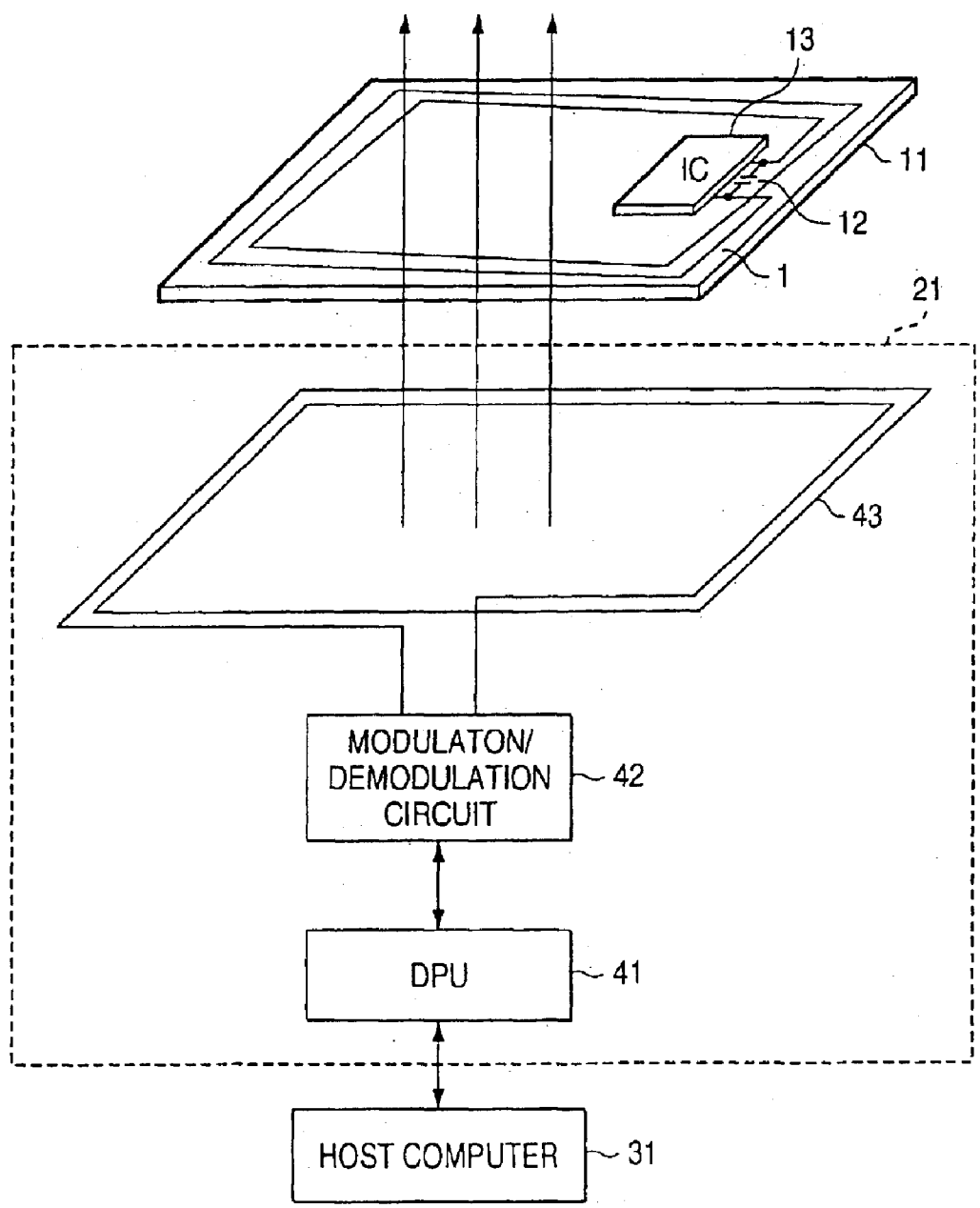
FIG. 4 is a block diagram showing an example of the construction of a non-contact IC card system to which the present invention is applied.

FIG. 4 shows an example of the construction of an non-contact type IC card. The IC card 11 is a battery-less type IC card having no battery for power supply. A loop antenna 1 constituting a resonance circuit in combination with a capacitor 12 receives electromagnetic wave (indicated by a solid line) emitted from a reader/writer 21, converts the electromagnetic wave received to an electrical signal and then supplies the electrical signal to IC 13. The inner construction of the IC 13 will be described later with reference to FIG. 5.

A host computer 31 controls DPU (Digital Processing Unit) 41 of the reader/writer 21 to write predetermined data into the IC card 11 or read out predetermined data from the IC card 11. Further, the host computer 31 processes the data which is input from DPU 41 and read out from the IC card 11, and displays the data on a display portion (not shown) as occasion demands.

DPU 41 generates control signals for various kinds of control on the basis of an instruction from the host computer 31 and controls a modulation/demodulation circuit 42. In addition, it generates transmission data corresponding to the instruction and supplies the data to the modulation/demodulation circuit 42. Further, DPU 41 generates reproduction data on the basis of response data from the modulation/demodulation circuit 42 and outputs the data to the host computer 31.

The modulation/demodulation circuit 42 modulates the transmission data input from DPU 41 and supplies the data to a loop antenna 43. The modulation/demodulation circuit 42 also demodulates modulated wave from the loop antenna 43, and inputs the demodulated data to DPU 41. The loop antenna 43 emits the electromagnetic wave corresponding to the modulated signal input from the modulation/demodulation circuit 42.

Next, the specific construction of the reader/writer 21 and IC 13 will be described with reference to FIG. 5. In this figure, the modulation/demodulation circuit 42 of the reader/writer 21 shown in FIG. 4 is illustrated as an oscillator 42A serving as a modulation circuit and a demodulation circuit 42B.

IC 13 which is connected to a resonance circuit comprising the loop antenna 1 and the capacitor 12 of the IC card 11 has a rectifying circuit 61. The rectifying circuit 61 comprises a diode 71, a resistor 72 and a capacitor 73. The rectifying circuit 61 rectifies and smoothens the signal supplied from the loop antenna 1, and supplies a positive-level voltage to a regulator 64. The regulator 64 stabilizes the positive-level voltage thus input, converts it to a DC voltage having a predetermined level and then supplies it as a power source to a sequencer 66 and other circuits.

A modulation circuit 62 is connected at the rear state of the rectifying circuit 61. The modulation circuit 62 comprises a series circuit of an impedance element 81 and FET (Field Effect Transistor) 82, and it is connected to the loop antenna 1 constituting a coil of the resonance circuit in parallel. FET 82 is turns on or off in conformity with the signal from the sequencer 66 to set a state that the impedance element 81 is inserted in parallel to the loop antenna 1 or a state that it is not inserted in parallel to the loop antenna 1, whereby the impedance (the load of the loop antenna 43) of the circuit electromagnetically-coupled to the loop antenna 43 of the reader/writer 21 through the loop antenna 1 is varied.

The signal which has been rectified and smoothened by the rectifying circuit 61 is supplied to a high pass-filter (hereinafter referred to as HPF (High pass-Filter)) 63 comprising a capacitor 91 and a resistor 92, and high-band components thereof are extracted and supplied to a demodulation circuit 65. The demodulation circuit 65 demodulates the signal of the high frequency components input thereto and outputs the signal to the sequencer 66.

The sequencer 66 has ROM (Read Only Memory) and RAM (Random Access Memory) (both are not shown) therein, stores a signal (command) input from the demodulation circuit 65 into RAM, analyzes the signal according to a program contained in ROM, and reads out data stored in the memory 67 on the basis of the analysis result as occasion demands. The sequencer 66 further generates a response signal to return a response corresponding to the command, and supplies it to the modulation circuit 62.

Next, the operation of the reader/writer 21 and the IC card 11 shown in FIG. 5 will be described by taking as examples a case where information is written from the reader/writer 21 into the IC card 11 and a case where information is read out from the IC card 11. The host computer 31 controls DPU 41 of the reader/writer 21, and instructs the writing of prescribed data into the IC card 11. On the basis of the instruction from the host computer 31, DPU 41 generates a command signal for the writing, generates transmission data (writing data) corresponding to the instruction and supplies the data to the oscillator 42A. The oscillator 42A modulates the oscillation signal on the basis of the signal input, and supplies it to the loop antenna 43. The loop antenna 43 emits the electromagnetic wave corresponding to the modulation signal input.

The resonance frequency of the resonance circuit comprising the loop antenna 1 and the capacitor 12 of the IC card 11 is set to the value corresponding to the oscillation frequency (carrier frequency) of the oscillator 42A. Accordingly, the resonance circuit receives the emitted electromagnetic wave by its resonance operation, converts the electromagnetic wave received to an electrical signal and then supplies it to the IC 13. The electrical signal thus converted is input to the rectifying circuit 61 equipped to the IC 13. The diode 71 of the rectifying circuit 61 rectifies the signal input, and the capacitor 73 smoothens the signal, and thereby supplying the positive-level voltage thereof to the regulator 64. The regulator 64 stabilizes the positive-level voltage input, converts it to the DC voltage having prescribed level, and then supplies the DC voltage as a power source to the sequencer 66 and other circuits.

The signal which has been rectified and smoothened by the rectifying circuit 61 is supplied through the modulation circuit 62 to HPF 63 to extract high-band components, and the high-band components thus extracted are supplied to the demodulation circuit 65. The demodulation circuit 65 demodulates the signal of the high-frequency components thus input, and outputs the signal to the sequencer 66. The sequencer 66 stores the signal (command) input from the demodulation circuit 65 into RAM, analyzes the signal according to the program contained in ROM, and writes the writing data supplied from the demodulation circuit 65 into a memory 67 on the basis of the analysis result.

When the command supplied from the demodulation circuit 65 is a reading command, the sequencer 66 reads out the data corresponding to the command from the memory 67. The sequencer 66 turns on or off FET 82 in conformity with the data thus read out. When FET 82 is turned on, the impedance element 81 is connected to the loop antenna 1 in parallel, and when FET 82 is turned off, the parallel connection is released. As a result, the impedance of the load circuit of the loop antenna 43 which is electromagnetically connected through the loop antenna 1 varies in accordance with the read-out data.

The terminal voltage of the loop antenna 43 varies in accordance with the variation of the impedance of the load thereof. The demodulation circuit 42B reads this variation to demodulate the read-out data and outputs the demodulated data to DPU 41. DPU 41 properly processes the data input thereto, and outputs the data thus processed to the host computer 31. The host computer 31 processes the read-out data input from DPU 41, and displays the data on the display portion (not shown) as occasion demands.

Figure 5:
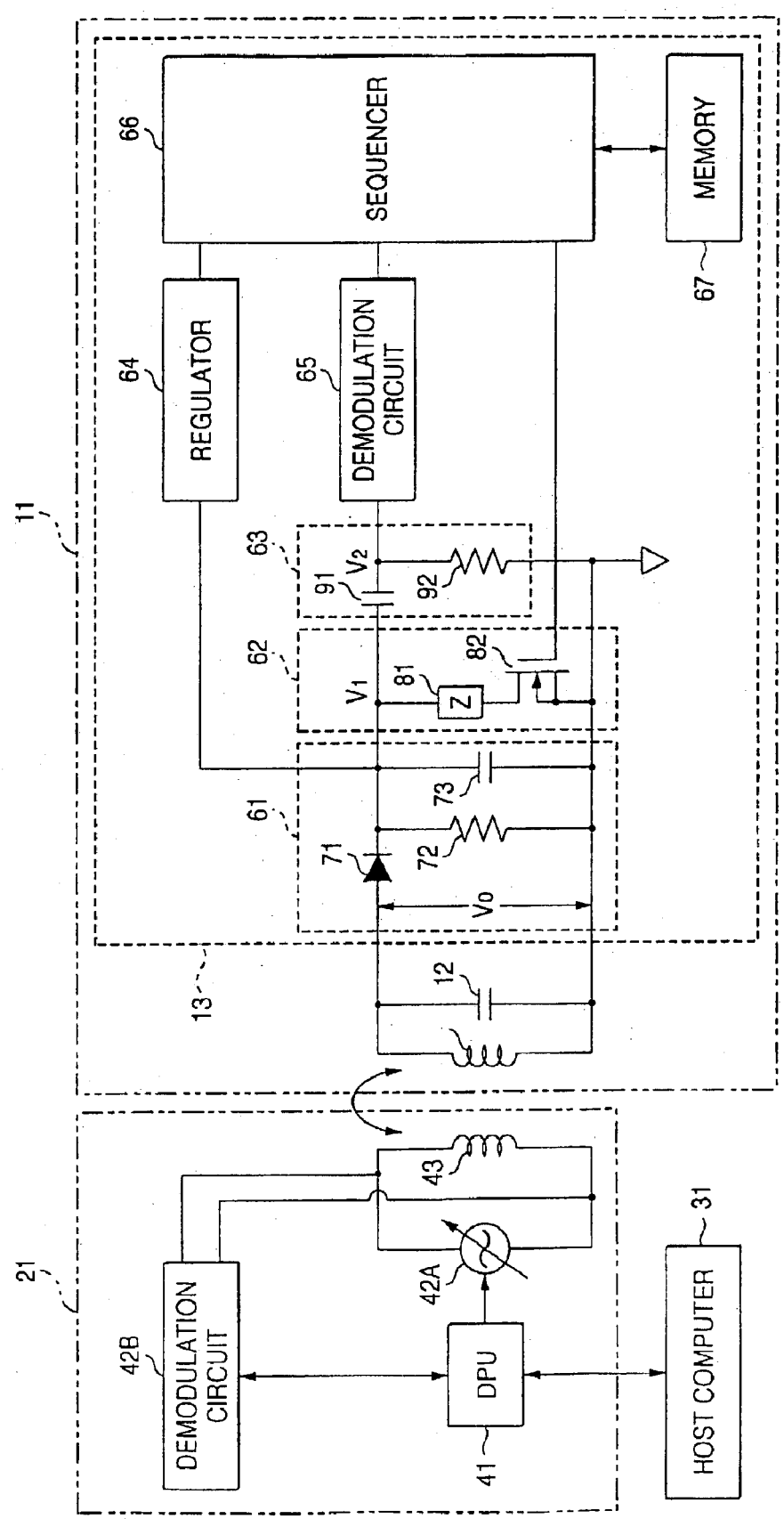
FIG. 5 is a circuit diagram showing an example of the construction of IC 13 of FIG. 4.
Figure 6:
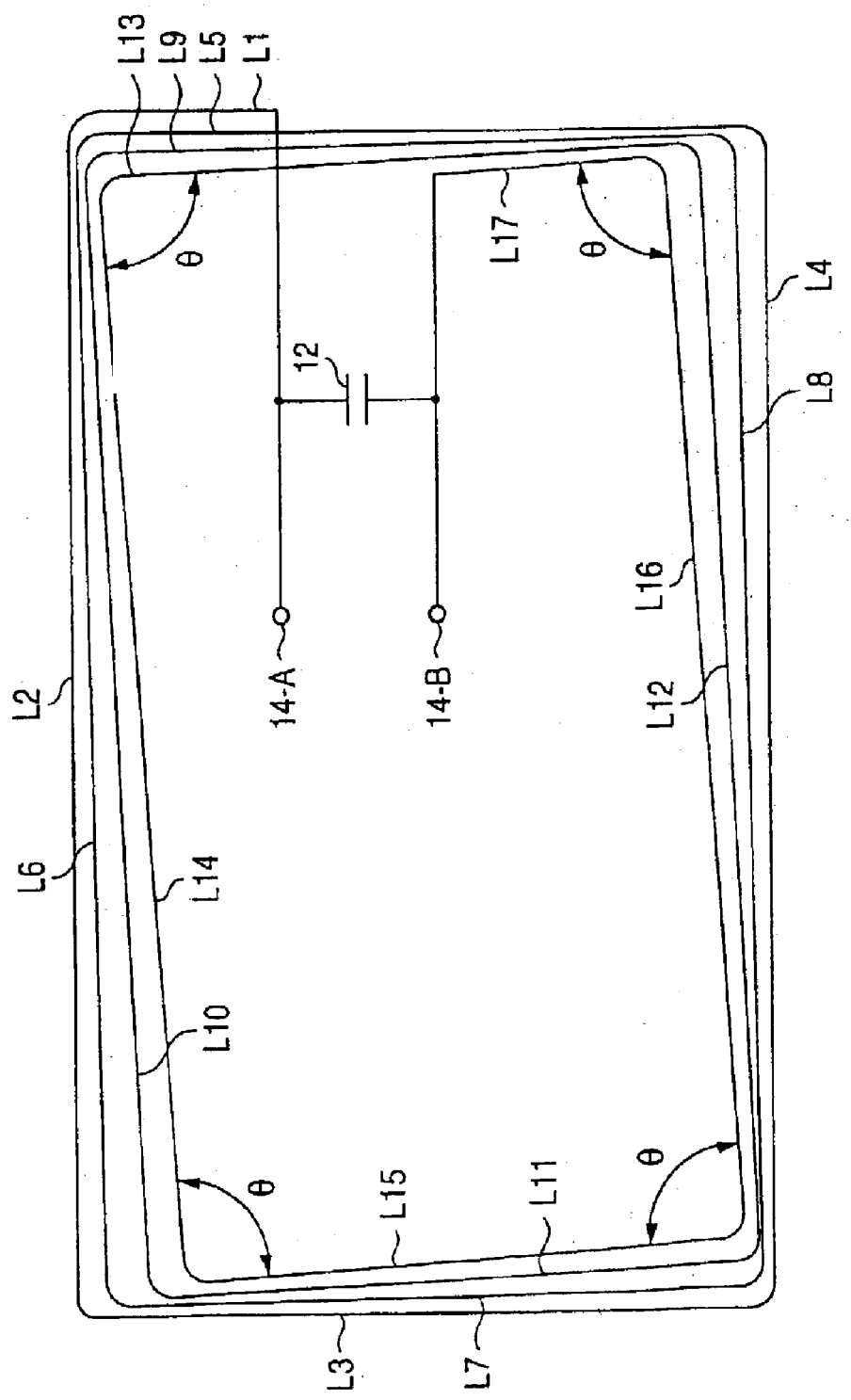
FIG. 6 is a diagram showing the shape of the loop antenna 1.

FIG. 6 shows the construction of the loop antenna 1 installed in the IC card 11 shown in FIGS. 4 and 5. The portions corresponding to the prior art are represented by the same reference numerals, and the description thereof is suitably omitted. The loop antenna 1 shown in FIG. 6 has a rectangular shape as a basic shape, and has four turns. The value of the inner angle θ of each of all the four corners is set to 90°−α in any turn. That is, the inner angle between the linear portion L1 and the linear portion L2, the inner angle between the linear portion L2 and the linear portion L3, the inner angle between the linear portion L3 and the linear portion L4 and the inner angle between the linear portion L4 and the linear portion L5 are set to 90°−α. Here, the value of the constant α may be set to any positive or negative value other than 0. Accordingly, the respective linear portions are kept in non-parallel state at each side of the rectangle. For example, at the upper side of the rectangle, the linear portions L2, L6, L10 and L14 are kept to be non-parallel to one another.

Figure 1:
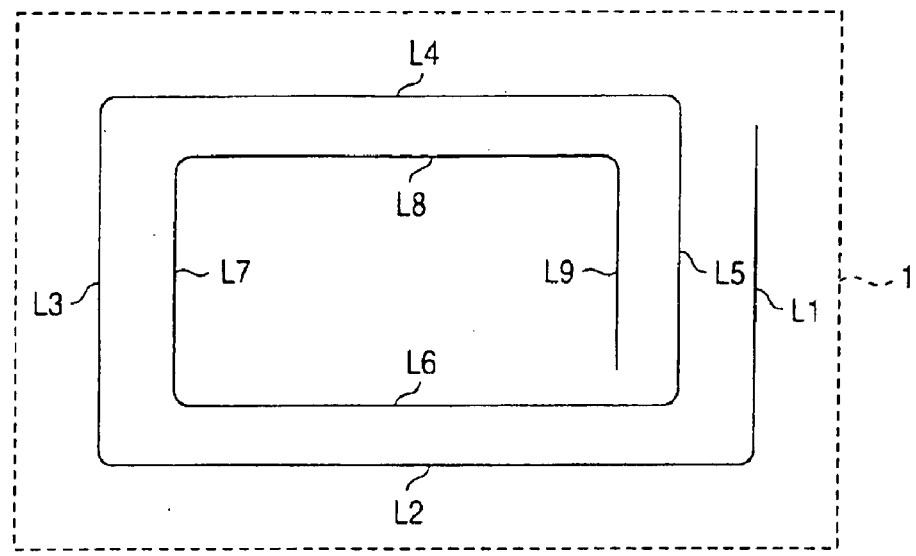
FIG. 1 is a diagram showing a loop antenna 1.
Figure 2:
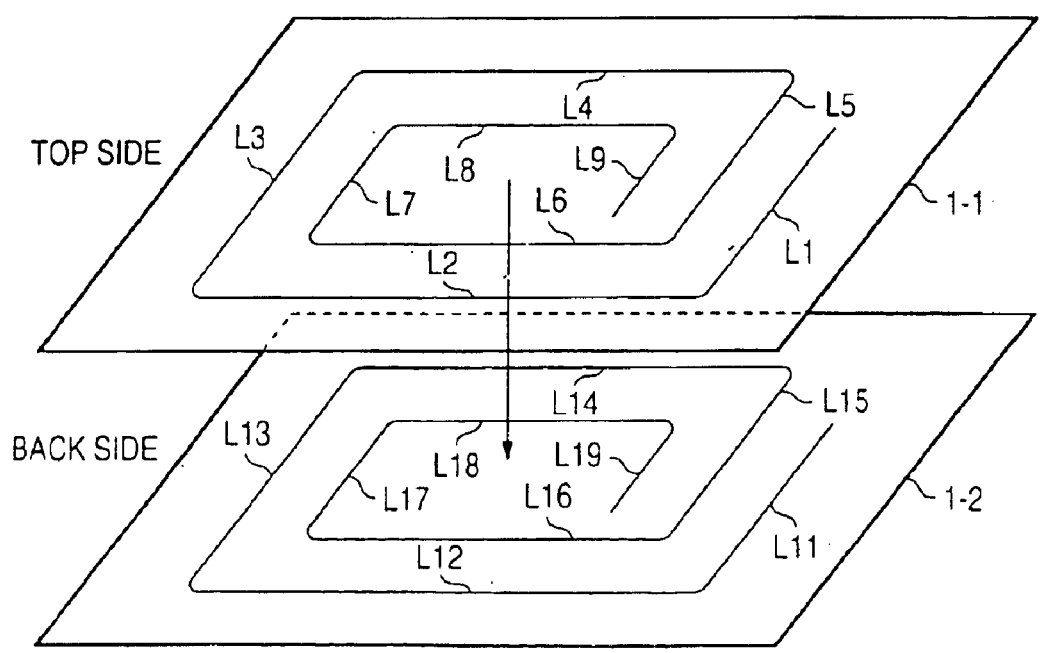
FIG. 2 is a diagram showing the overlap between loop antennas 1.
Figure 3:
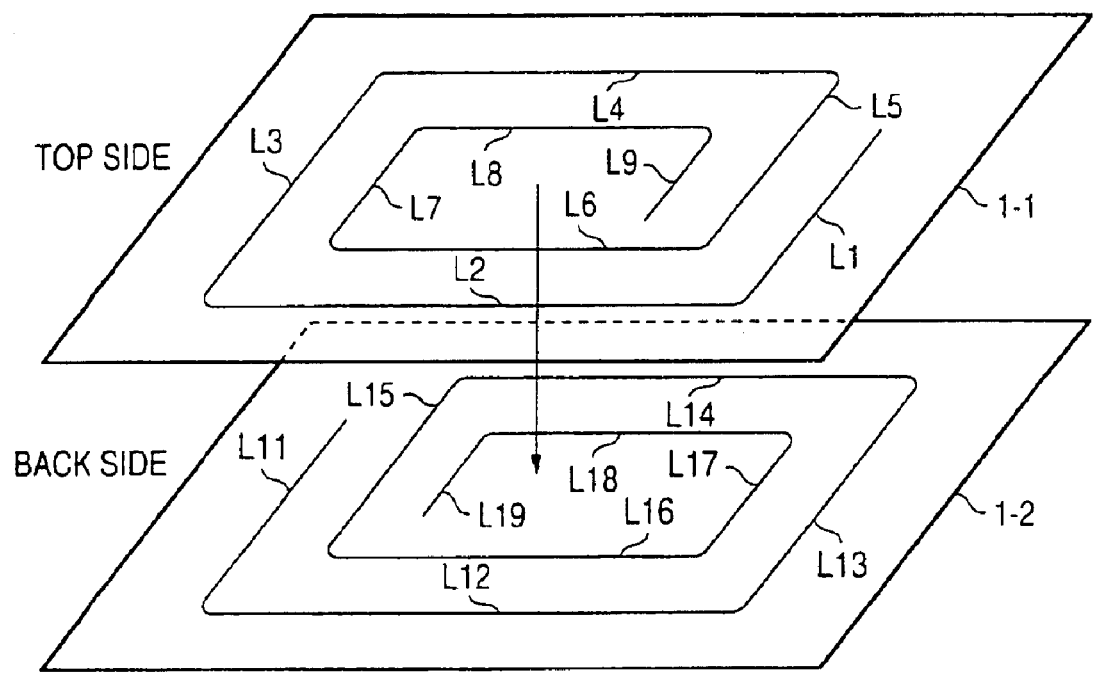
FIG. 3 is a diagram showing the overlap between the loop antennas 1.

The terminals 14-A, 14-B are connected to IC 13. By designing the loop antenna 1 in such a shape, the linear portions of the loop antenna 1 are hardly coupled to one another (when viewed from the upper side, the overlap portion of the linear portions is reduced) and thus the reduction in reception efficiency can be suppressed in both the case where the two IC cards 11 are stacked with being faced in the same direction as shown in FIG. 2 and the case where thy are stacked with being faced in the opposite directions as shown in FIG. 3.

As a result, in any case where one IC card 11 is used, two IC cards are stacked with being faced in the same direction or two IC cards are stacked with being faced in the opposite directions, the reception sensitivity enough for communications can be achieved.

Figure 7:
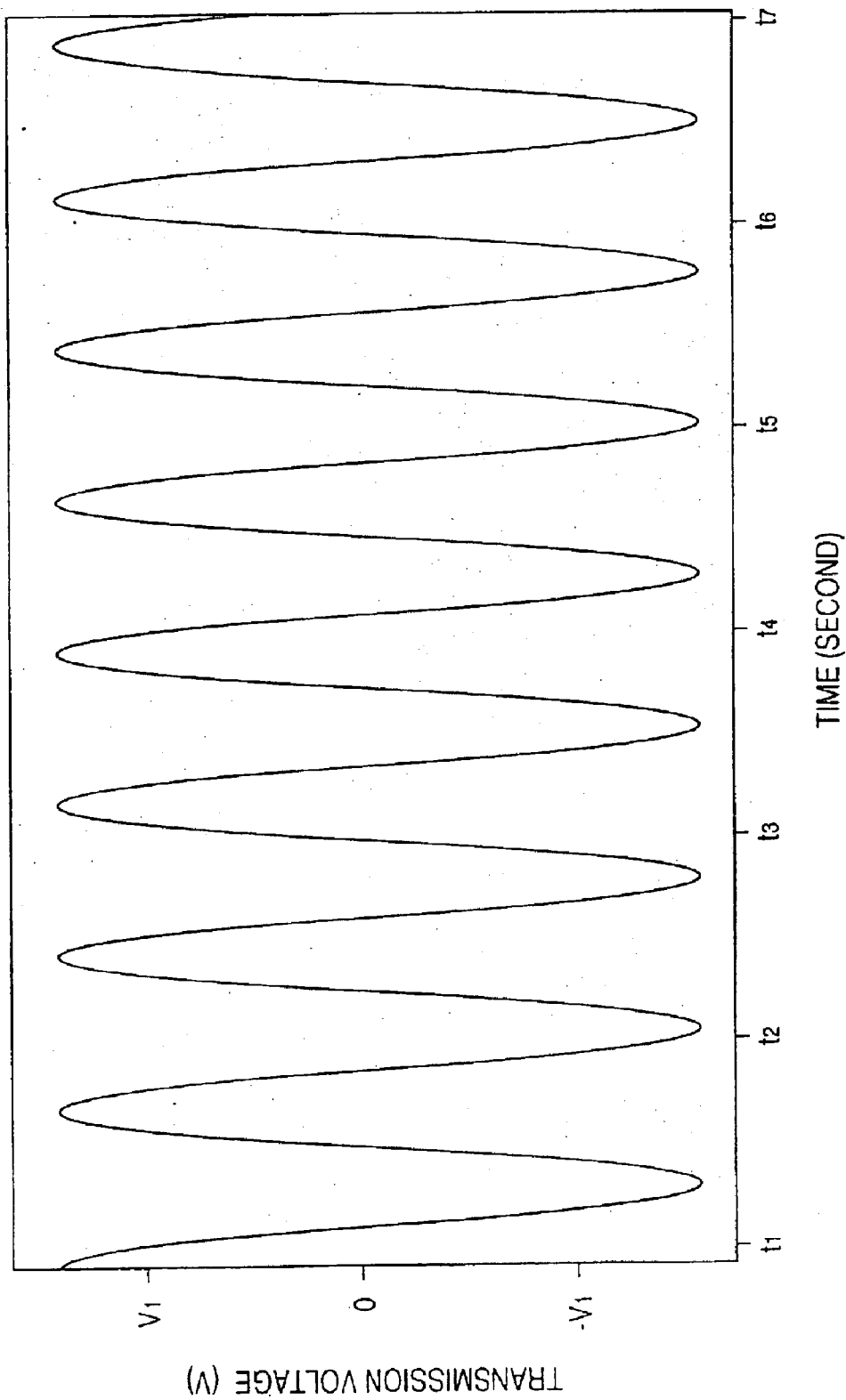
FIG. 7 is a diagram showing a signal transmitted from a reader/writer 21.
Figure 8:
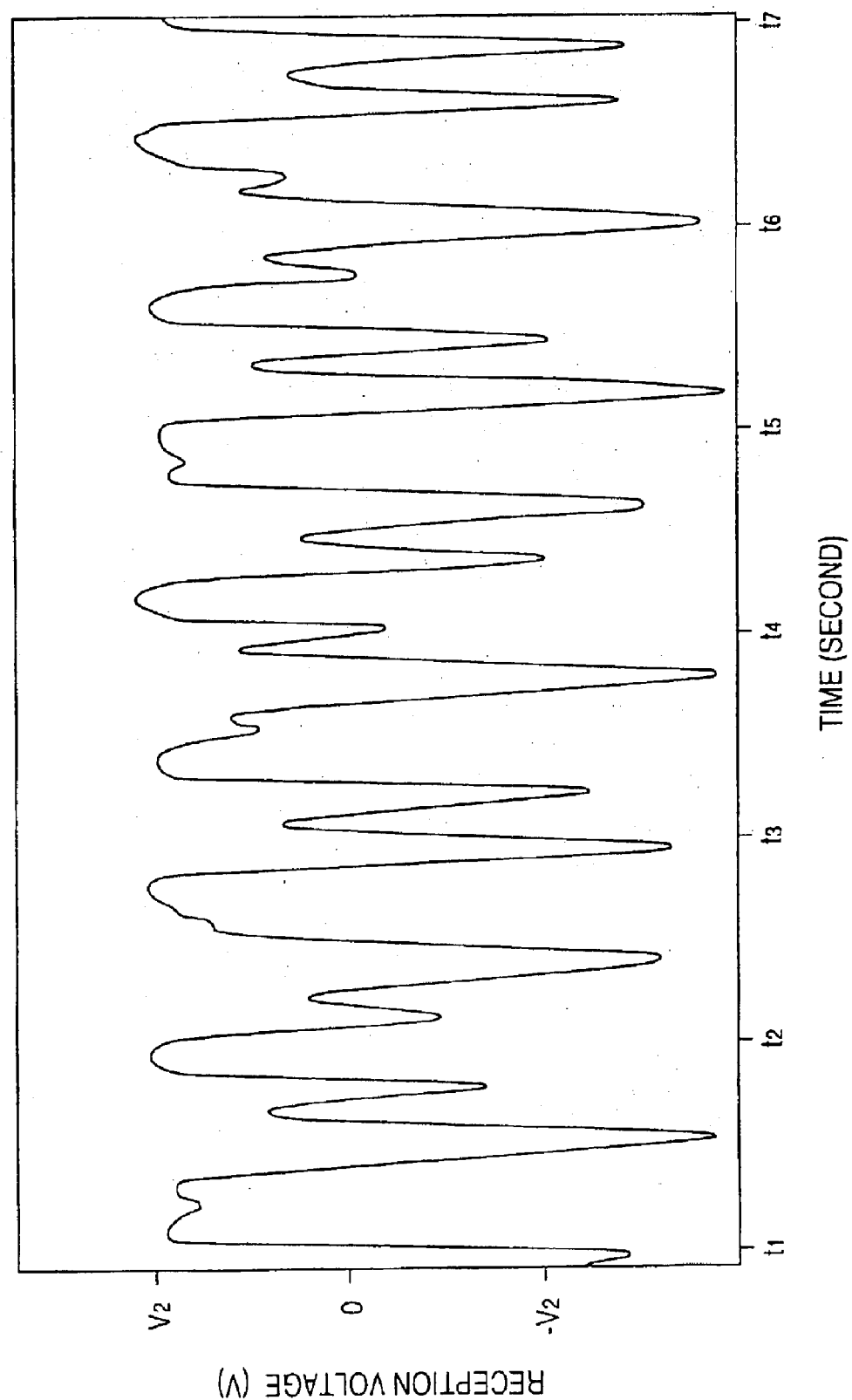
FIG. 8 is a diagram showing a signal processed by an IC card 11.

Next, FIG. 8 shows the measurement result of a reception voltage received by an IC card 11 to which the loop antenna 1 as shown in FIG. 6 is applied when a signal having a waveform as shown in FIG. 7 is transmitted from the reader/writer 21 to the IC card 11. In FIG. 7, the axis of ordinate represents a transmission voltage (V), and the axis of abscissa represents a lapse time (second). In FIG. 8, the axis of ordinate represents a reception voltage (V), and the axis of abscissa represents a lapse time (second).

The voltage V1 of FIG. 7 and the voltage V2 of FIG. 8 have different values, and the axes of ordinate of FIGS. 7 and 8 are different in scale. The measurement result shown in FIG. 8 is a measurement result when two IC cards 11 each having a loop antenna 1 as shown in FIG. 6 are stacked with being faced in the opposite directions as shown in FIG. 3.

Figure 9:
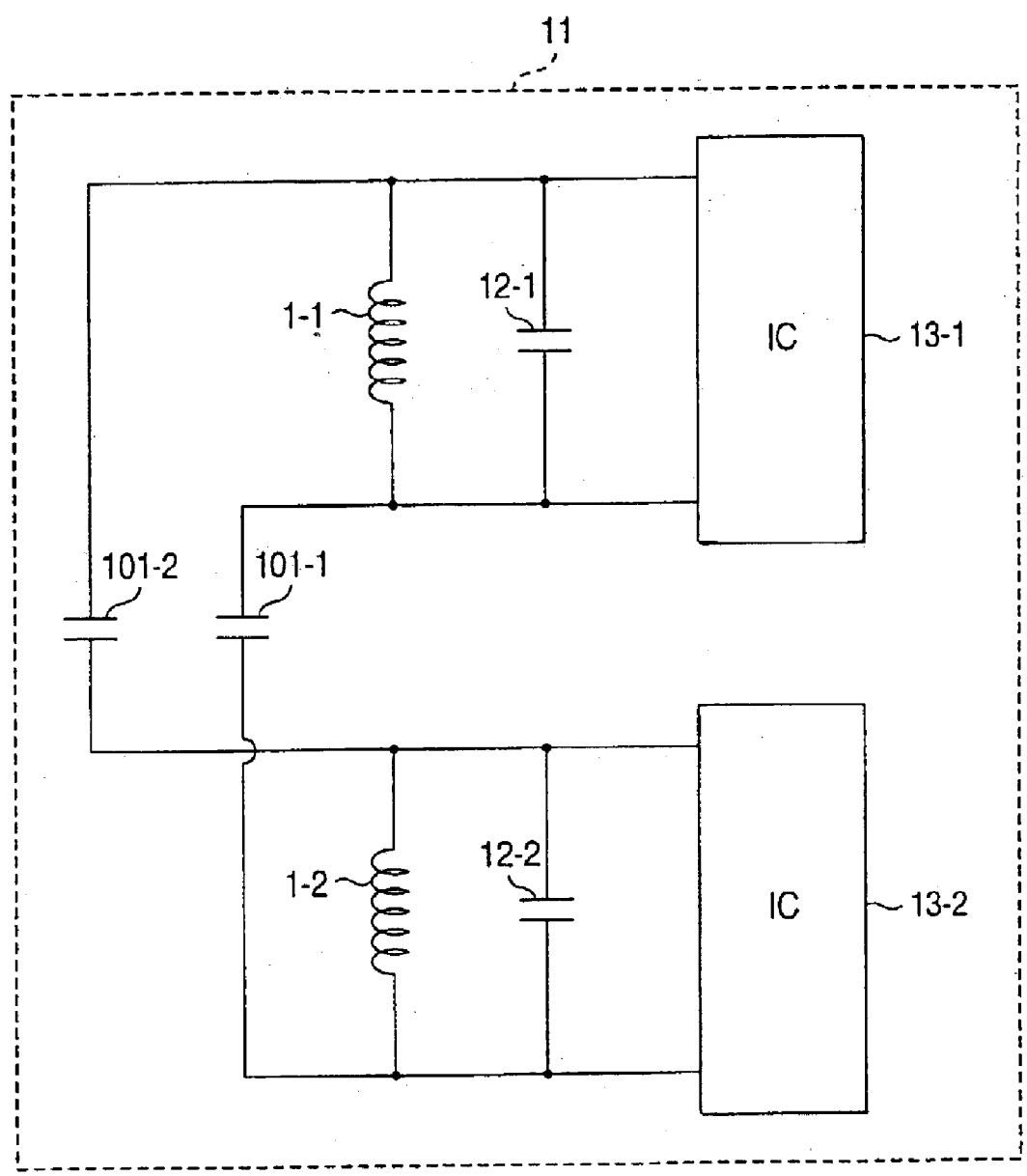
FIG. 9 is a diagram showing a equivalent circuit when two loop antennas 1 are overlapped with each other.

Even when a signal having a good waveform as shown in FIG. 7 is transmitted from the reader/writer 21 to the IC card 11, it is processed as a signal having a distorted waveform as shown in FIG. 8 at the IC card 11. In order to discover the cause for the distortion, a schematic equivalent circuit to the IC card 11 as shown in FIG. 9 is considered.

In this case, it may be considered that two IC cards 11 are kept to be stacked and the IC cards 11 having the same construction are connected to each other through a capacitor 101-1 and a capacitor 101-2. The inner construction of the IC 13-1, 13-2 is similar to the inner construction of the IC 13 shown in FIG. 5, and it comprises the rectifying circuit 61, the modulation circuit 62, etc.

The reason why the signal to be processed at the IC card 11 becomes a signal having distortion as shown in FIG. 8 when the signal having the waveform shown in FIG. 7 is transmitted from the reader/writer 21 to the IC card 11 is associated with capacitance represented by the capacitors 101-1, 101-2 which are induced by the overlap between the two loop antenna 1-1 (IC card 1-1) and the loop antenna 1-2 (IC card 1-2). The distortion can be suppressed by reducing the capacitance.

The capacitance represented by the capacitors 101-1, 101-2 is dependent on the physically overlapped portion between the loop antenna 1-1 and the loop antenna 1-2. That is, as the overlap portion between the loop antenna 1-1 and the loop antenna 1-2 is increased, the capacitance represented by the capacitor 101-1, 101-2 is increased. Particularly in the loop antenna 1 having a shape as shown in FIG. 6, the lines at the portions other than the linear portions L1 to L16, that is, at the four corner portions are in closer formation than at the linear portions. If the loop antennas are prevented from being overlapped with each other at the four corner portions, the capacitance represented by the capacitors 101-1, 102-2 could be reduced.

Figure 10:
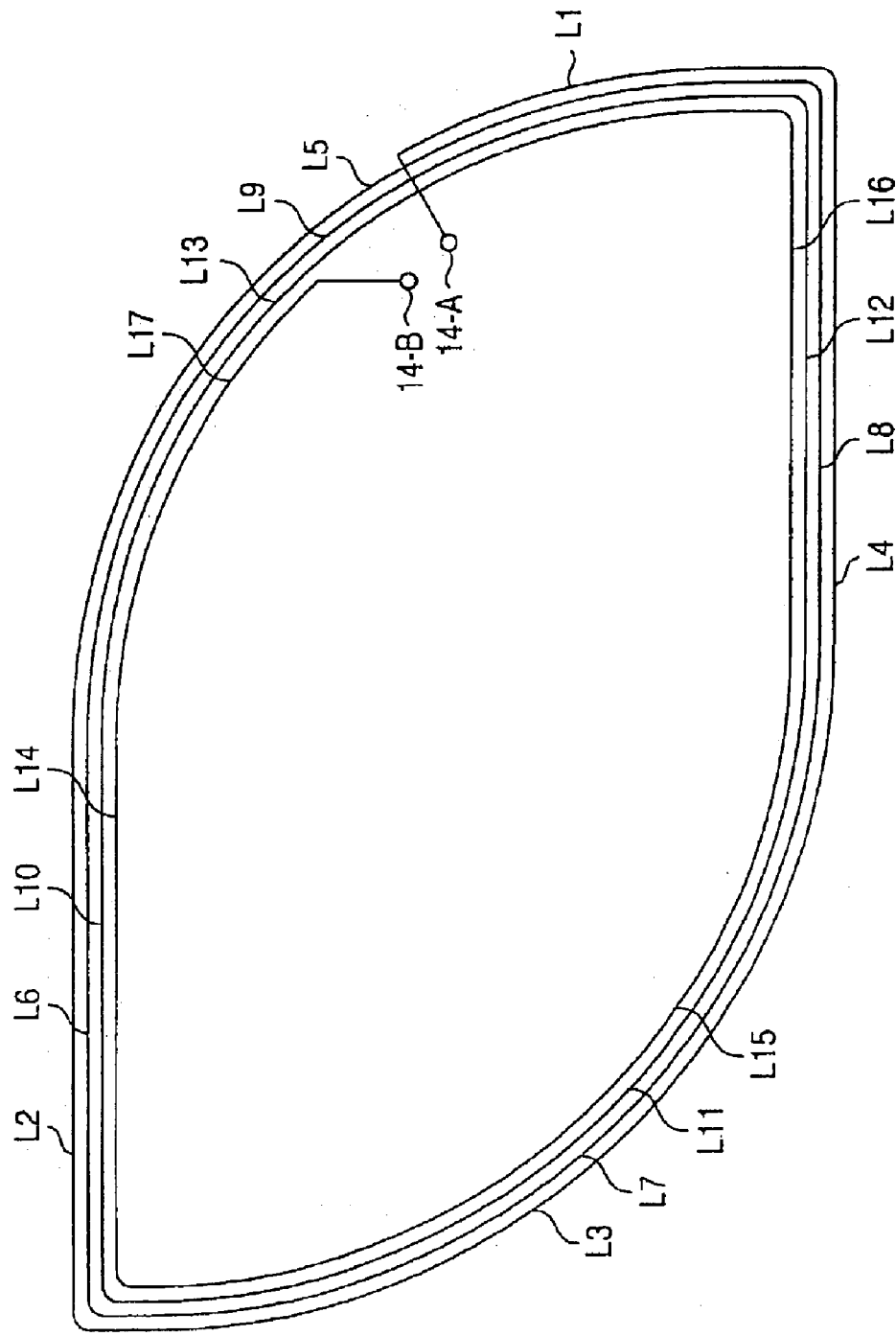
FIG. 10 is a diagram showing another shape of the loop antenna 1.

Therefore, a loop antenna 1 having a shape as shown in FIG. 10 is considered. In the loop antenna 1 shown in FIG. 10, the portions corresponding to the loop antenna 1 shown in FIG. 6 are represented by the same reference numerals. In the shape of the loop antenna 1 shown in FIG. 10, two sides out of four sides comprise a substantially arcuate curved line L1, L5, L9, L13, L17 and a substantially arcuate curved line L3, L7, L11, L15 at the confronting position, and the remaining two sides comprise a linear portion L2, L6, L10, L14 and a linear portion L4, L8, L12, L16 at the confronting position.

In FIG. 10, IC 13 is connected between the terminals 14-A and 14-B (not shown), and the capacitor 12 is connected to IC 13 in parallel.

Figure 11:
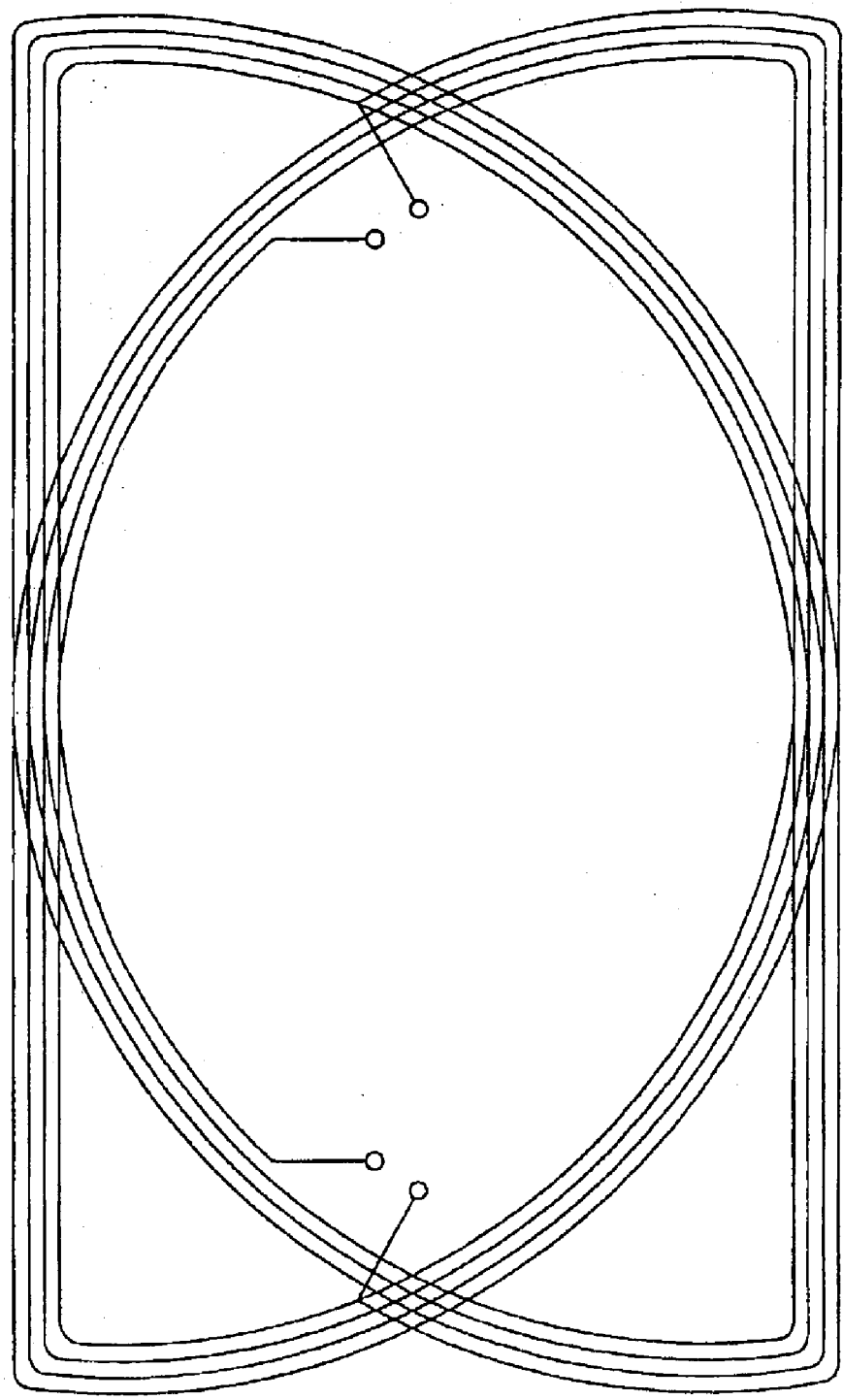
FIG. 11 is a diagram showing a state that two loop antennas 1 having the shape shown in FIG. 10 are overlapped with each other.

By setting the two corners out of the four corners to right-angle shape and setting the other two corners to curved-line shape, as shown in FIG. 11 the two loop antennas 1 are prevented from being overlapped with each other at the corner portions at which the lines are closer to one another even when the two loop antennas 1 are overlapped with each other with being faced in the opposite directions, and thus the signal received can be processed as a signal having less distortion.

Figure 12:
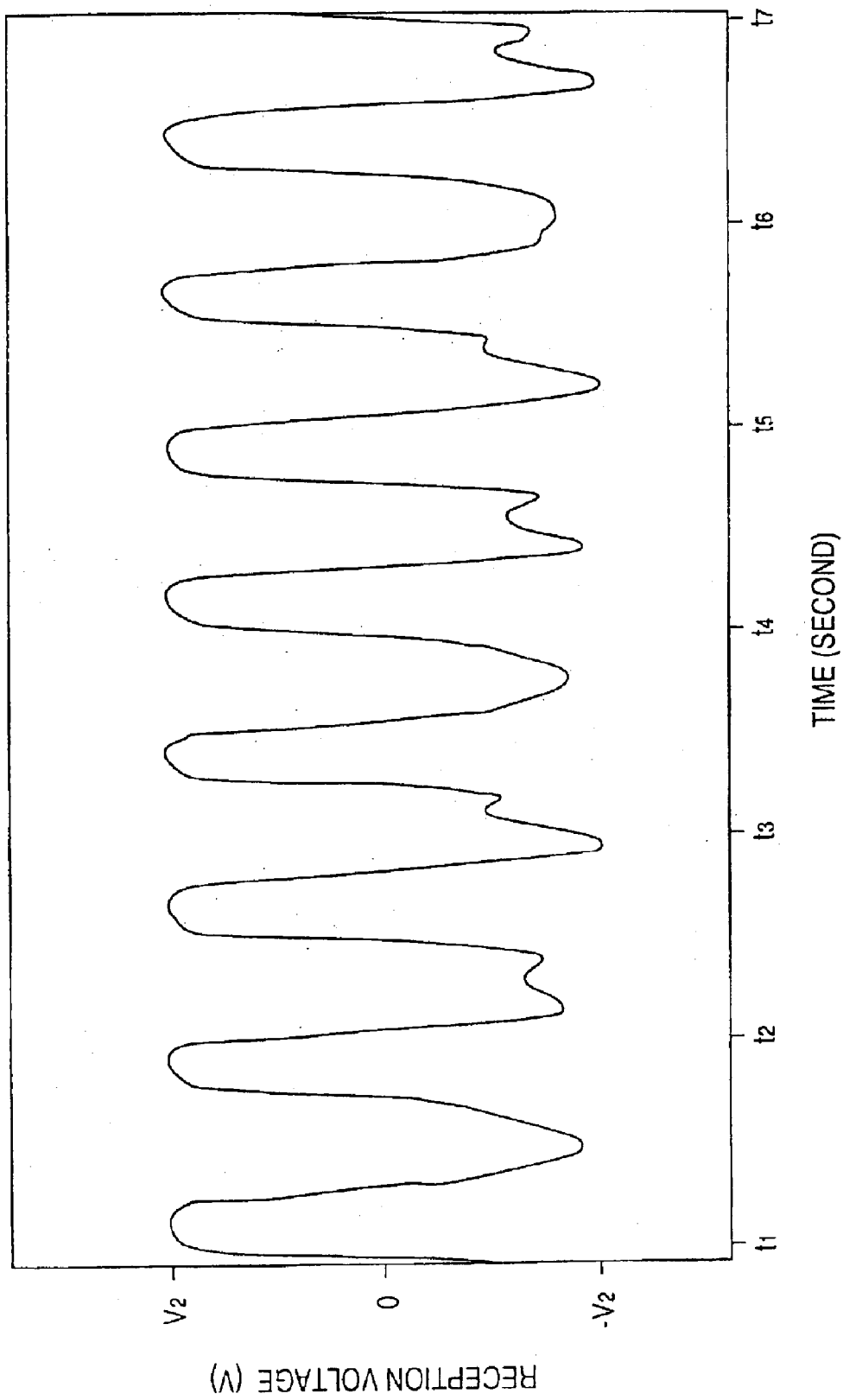
FIG. 12 is a diagram showing a signal to be processed by the IC card 11.

FIG. 12 is a diagram showing a signal to be processed in the IC card 11 when a signal having a waveform as shown in FIG. 7 is received from the reader/writer 21 by a substantially one IC card 11 achieved by stacking two IC cards 11 equipped with the loop antenna 1 having the shape shown in FIG. 10 so that the IC cards 11 are faced in the opposite directions (that is, the IC card 11 including two loop antennas 1 overlapped with each other as shown in FIG. 11).

Comparing the waveform shown in FIG. 8 and the waveform shown in FIG. 12, it is apparent that the waveform shown in FIG. 12 has less distortion than the waveform shown in FIG. 8. When an IC card 11 is fabricated so that two loop antennas 1 are overlapped with each other with being faced in the opposite directions, the signal received can be processed as a signal having less distortion by designing the loop antennas so that the overlap portion thereof is reduced, particularly the four corner portions are not overlapped. The shape in which the four corner portions are not overlapped results in reduction in the overlap portion as a whole.

As the shape of the loop antenna 1 based on the consideration that the four corner portions (portions at which the line density is high) are not overlapped may be used such a shape as shown in FIG. 13 in addition to the shape shown in FIG. 10.

Figure 13A:
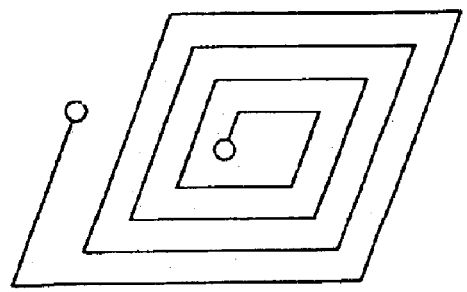
FIG. 13A is a diagram showing another shape of the loop antenna 1.

The shape shown in FIG. 13A is a parallelogram, and the upper and lower sides in the figure are disposed in parallel to the sides of the IC card 11.

Figure 13B:
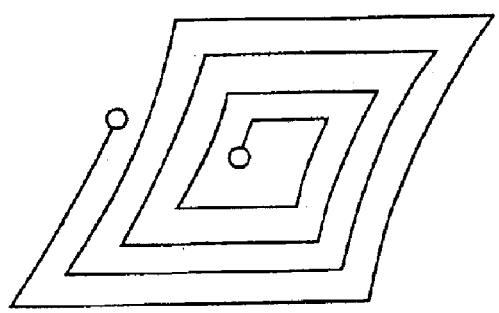
FIG. 13B is a diagram showing another shape of the loop antenna 1.
Figure 13C:
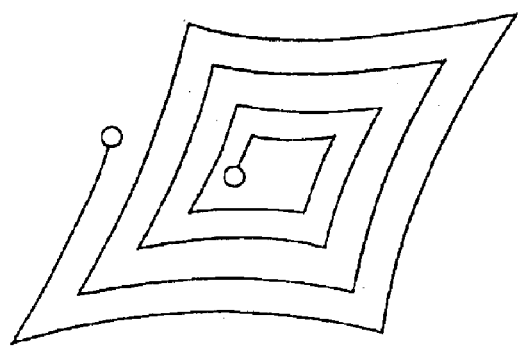
FIG. 13C is a diagram showing another shape of the loop antenna 1.

The shape shown in FIG. 13B is set so that the two sides out of the four sides of the parallelogram shown in FIG. 13A are formed of curved lines and the sides of the upper and lower linear portions in the figure are disposed in parallel to the sides of the IC card 11. The shape shown in FIG. 13C is set so that all the four sides of the parallelogram shown in FIG. 13A are formed of curved lines, and one diagonal line of this shape is disposed to be coincident with one diagonal line of the IC card 11.

Figure 13D:
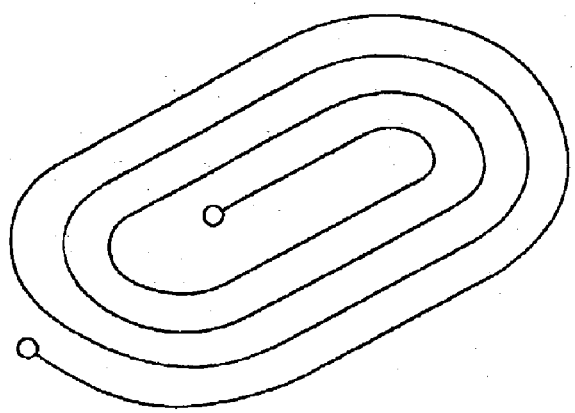
FIG. 13D is a diagram showing another shape of the loop antenna 1.
Figure 13E:
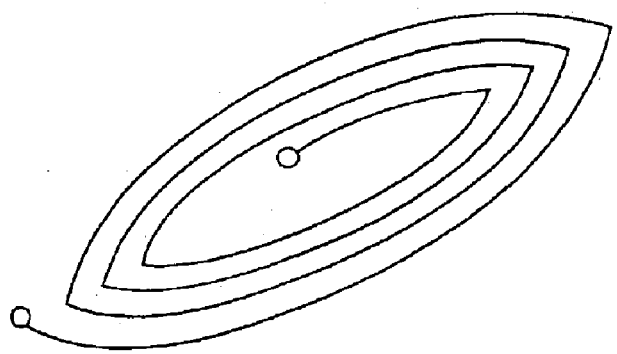
FIG. 13E is a diagram showing another shape of the loop antenna 1.
Figure 13F:
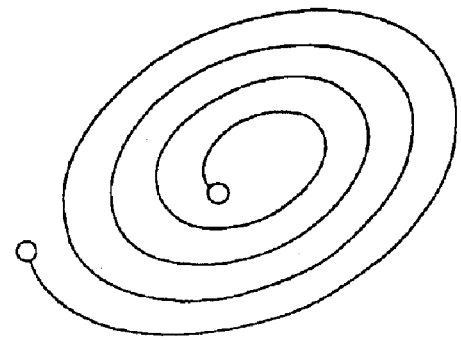
FIG. 13F is a diagram showing another shape of the loop antenna 1.

The shape shown in FIG. 13D is set so that two sides of the four sides of the figure are formed of curved lines and the other two sides are formed of straight lines, and the curved lines are disposed to be close to the corners of the IC card 11. The shape shown in FIG. 13E is formed of curved lines of two sides, and the line (diagonal line) connecting the positions at which the curved lines are inverted (corresponding to the corners) is disposed to be coincident with one diagonal line of the IC card 11. Further, the shape shown in FIG. 13F is an elliptical shape, and the major axis of the elliptical shape is disposed to be coincident with the diagonal line of the IC card 11.

The shape of the loop antenna 1 shown in FIG. 10 or FIG. 13 is set so that when two IC cards 11 are stacked with being faced in the opposite directions as described above, the corner portions (containing the corner represented by a curved line) of the loop antenna 1 are not overlapped.

In other words, the shape of the loop antenna 1 is set so that one of corner portions which confront each other with respect to the center line of the IC card 11 (for example, the corner portion formed by the curved line L3 and the linear portion L4 in FIG. 10) is far away from the center line and the other corner portion (for example, the corner portion formed by the linear portion L4 and the curved line portion L5 in FIG. 10) is closer to the center line.

Further, in other words, the shape of the loop antenna 1 is set so that the diagonal line of the IC card 11 is coincident with the line connecting two points of the loop antenna 1, one point being located at the closest position to the corner portion of the IC card 11 and the other point being located at the confronting position (for example, in FIG. 10, the intersecting point between the curved line portion L3 and the linear portion L4 and the intersecting point between the curved line portion L5 and the linear portion L6).

By using the loop antenna 1 having any shape shown in FIG. 10 or FIG. 13 as the antenna of an IC card 11, the reduction in reception sensitivity can be suppressed even when two IC cards 11 are used while stacked, and the same reception sensitivity as used when only one IC card is used can be achieved. Further, the distortion of the signal to be received and processed can be suppressed. Further, even when plural IC cards 11 of two or more are used while stacked, the above-described concept is effective, and the reduction in reception efficiency can be suppressed at maximum and the distortion can be suppressed even when the IC cards are stacked in any way.

Accordingly, by using the present invention, such an anticollision system that IC cards 11 are used while stacked can be easily fabricated.

In the foregoing description, the loop antenna 1 has four or six turns. However, the number of turns may be set to any value. Further, the loop antenna 1 is equipped to the IC card 11. However, the present invention may be applied to a card-like (planar) electronic device other than the IC card.

The term "system" in this specification means an overall apparatus comprising plural devices, means or the like.

INDUSTRIAL APPLICABILITY

As described above, according to the electronic device of the present invention, when plural electronic devices are stacked so that at least parts of the top sides thereof face each other or at least parts of the back sides thereof face each other, conductors constituting the loop antenna portions located in the neighborhood of the corners of the electronic device having a substantially rectangular shape are not overlapped with each other. Therefore, the reduction in reception sensitivity can be suppressed, and the distortion of the signal received can be suppressed.

What is claimed is:

1. A substantially-planar electronic device having a substantially rectangular shape, comprising:
    a loop antenna having at least two turns of wiring that form a first arc-shaped portion and a second arc-shaped portion,
    wherein the first arc-shaped portion includes a first curved portion and a first linear portion the second arc-shaped portion includes a second curved portion and a second linear portion,
    wherein a first corner of the loop antenna is formed by the first curved portion of the first arc-shaped portion meeting the second linear portion of the second arc-shaped portion, wherein a second corner of the loop antenna is formed by the first linear portion of the first arc-shaped portion meeting the second curved portion of the second arc-shaped portion,
    wherein the loop antenna is a first loop antenna and is oriented such that the first corner and the second corner of the first loop antenna are each in close proximity to at least one corner of the planar electronic device,
    wherein the orientation of the first loop antenna prevents overlap of the first and second corner of the first loop antenna by corners of a second loop antenna, and
    wherein the second loop antenna is in another planar electronic device that at least partially overlaps the planar electronic device of the first loop antenna.

2. The electronic device as claimed in claim 1, wherein said loop antenna is shaped to have a parallelogram shape or elliptical shape as a basic shape.

3. The electronic device as claimed in claim 1, wherein the basic shape of said loop antenna is constructed as a substantially annular shape by a combination of two straight lines and two curved lines while the two straight lines are disposed in parallel to each other.

4. The electronic device as claimed in claim 1, wherein the basic shape of said loop antenna is constructed as a substantially annular shape by a combination of two or four curved lines that are different in shape.

5. The substantially-planar electronic device as claimed in claim 1, wherein said device is a non-contact IC card.

6. An information device for writing information to or reading information from a substantially-planar electronic device having a substantially rectangular device, the information device comprising:
    an antenna; and
    reading writing means for reading information from or writing information to each of a plurality of electronic devices when said plurality of electronic devices are partially overlapped with one another and each of said plurality of electronic devices has a loop antenna having at least two turns of wiring that form a first arc-shaped portion and a second arc-shaped portion,
    wherein the first arc-shaped portion includes a first curved portion and a first linear portion, the second arc-shaped portion includes a second curved portion and a second linear portion,
    wherein a first corner of the loop antenna is formed by the first curved portion of the first arc-shaped portion meeting the second linear portion of the second arc-shaped portion, wherein a second corner of the loop antenna is formed by the first linear portion of the first arc-shaped portion meeting the second curved portion of the second arc-shaped portion,
    wherein the loop antenna is a first loop antenna of a first planar electronic device of the plurality of electronic devices and is oriented such that the first corner and the second corner of the first loop antenna are each in close proximity to at least one corner of the planar electronic device,
    wherein the orientation of the first loop antenna prevents overlap of the first and second corner of the first loop antenna by corners of a second loop antenna, and
    wherein the second loop antenna is in a second planar electronic device of the plurality of electronic devices that at least partially overlaps the first planar electronic device of the first loop antenna.

7. An information reading method for reading information from a substantially-planar electronic device having a substantially rectangular device, the method comprising the steps of:

emitting an electromagnetic wave to said electronic device; and reading information from the electronic device, said electronic device having a loop antenna comprised of at least two turns of wiring that form a first arc-shaped portion and a second arc-shaped portion, wherein the first arc-shaped portion includes a first curved portion and a first linear portion, the second arc-shaped portion includes a second curved portion and a second linear portion, wherein a first corner of the loop antenna is formed by the first curved portion of the first arc-shaped portion meeting the second linear portion of the second arc-shaped portion, wherein a second corner of the loop antenna is formed by the first linear portion of the first arc-shaped portion meeting the second curved portion of the second arc-shaped portion, wherein the loop antenna is a first loop antenna and is oriented such that the first corner and the second corner of the first loop antenna are each in close proximity to at least one corner of the electronic device, wherein the orientation of the first loop antenna prevents overlap of the first and second corner of the first loop antenna by corners of a second loop antenna, and wherein the second loop antenna is in another planar electronic device that at least partially overlaps the planar electronic device of the first loop antenna.

8. A substantially-planar electronic device having a substantially rectangular shape, comprising:

a loop antenna having at least two turns of wiring that form a first side and a second side, said first side includes a first linear portion and a first arc-shaped portion and the second side includes a second linear portion and a second arc-shaped portion.

9. The electronic device of claim 8, wherein the first arc-shaped portion meets the second linear portion at a first corner of the loop antenna, and the second arc-shaped portion meets the first linear portion at a second corner of the loop antenna.

10. The electronic device of claim 9, wherein the loop antenna is a first loop antenna and is oriented such that the first corner and the second corner of the first loop antenna are each in close proximity to at least one corner of the electronic device, wherein the orientation of the first loop antenna prevents overlap of the first and second corner of the first loop antenna by corners of a second loop antenna, and wherein the second loop antenna is in another planar electronic device that at least partially overlaps the planar electronic device of the first loop antenna.

11. A planar electronic device having a substantially rectangular shape, comprising:

a loop antenna having at least two turns of wiring that form a polygonal shaped coil, said coil having a first arc-shaped side and a second arc-shaped side, wherein said first arc-shaped side and said second arc-shaped side meet to form a first corner of the loop antenna and a second corner of the loop antenna.

12. The electronic device of claim 11, wherein the loop antenna is a first loop antenna and is oriented such that the first corner and the second corner of the first loop antenna are each in close proximity to at least one corner of the electronic device, wherein the orientation of the first loop antenna prevents overlap of the first and second corner of the first loop antenna by corners of a second loop antenna, and wherein the second loop antenna is in another planar electronic device that at least partially overlaps the planar electronic device of the first loop antenna.

* * * * *